United States Patent
Grabb et al.

(10) Patent No.: US 6,539,062 B1
(45) Date of Patent: Mar. 25, 2003

(54) PILOT SIGNAL CONTROL FOR DIGITAL TELEVISION DTV TRANSMISSION

(75) Inventors: Mark Lewis Grabb, Burnt Hills, NY (US); John Erik Hershey, Ballston Lake, NY (US); Kenneth Brakeley Welles, II, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/422,440

(22) Filed: Oct. 21, 1999

(51) Int. Cl.[7] .................................................. H04L 5/12
(52) U.S. Cl. ........................ 375/261; 375/270; 375/301
(58) Field of Search ................................. 375/321, 298, 375/261, 270, 301; 329/304, 357; 332/103, 170; 455/47; 348/641

(56) References Cited

U.S. PATENT DOCUMENTS 5,673,293 A * 9/1997 Scarpa et al. ................ 375/321
5,799,037 A * 8/1998 Strolle et al. ................ 375/233
6,301,298 B1 * 10/2001 Kuntz et al. ................. 375/232

* cited by examiner

*Primary Examiner*—Don N. Vo
(74) *Attorney, Agent, or Firm*—John F. Thompson; Patrick K. Patnode

(57) ABSTRACT

An Advanced Television Standards Committee (ATSC)-compliant pilot tone is generated within an 8-VSB (eight level vestigial sideband) transmission in order to enable Quadrature Amplitude Modulation (QAM) receiver designs to more efficiently process the transmitted/received 8-VSB signal. The method and apparatus also efficiently removes the pilot tone before using conventional QAM demodulator equipment for directly demodulating the 8-VSB signal.

14 Claims, 7 Drawing Sheets

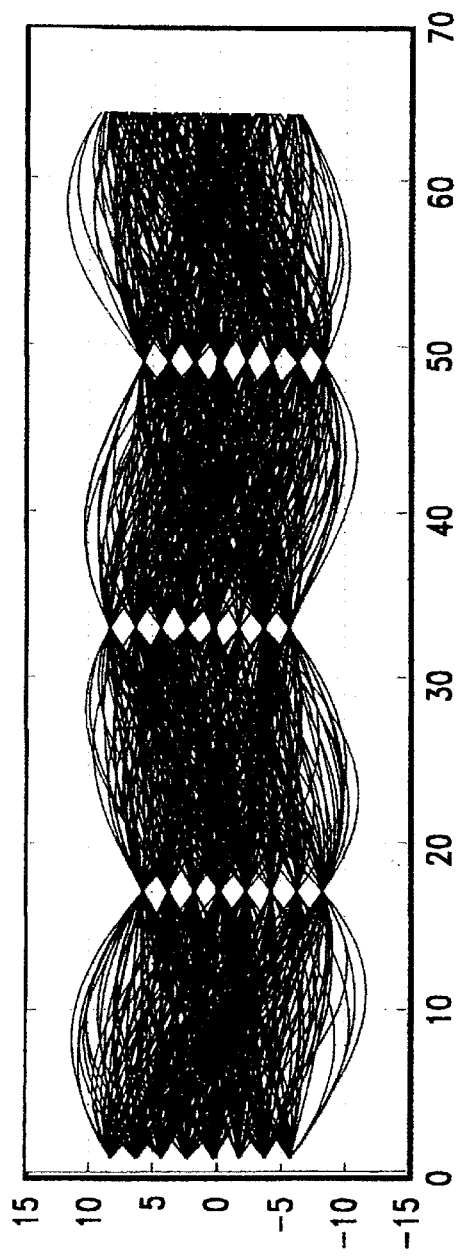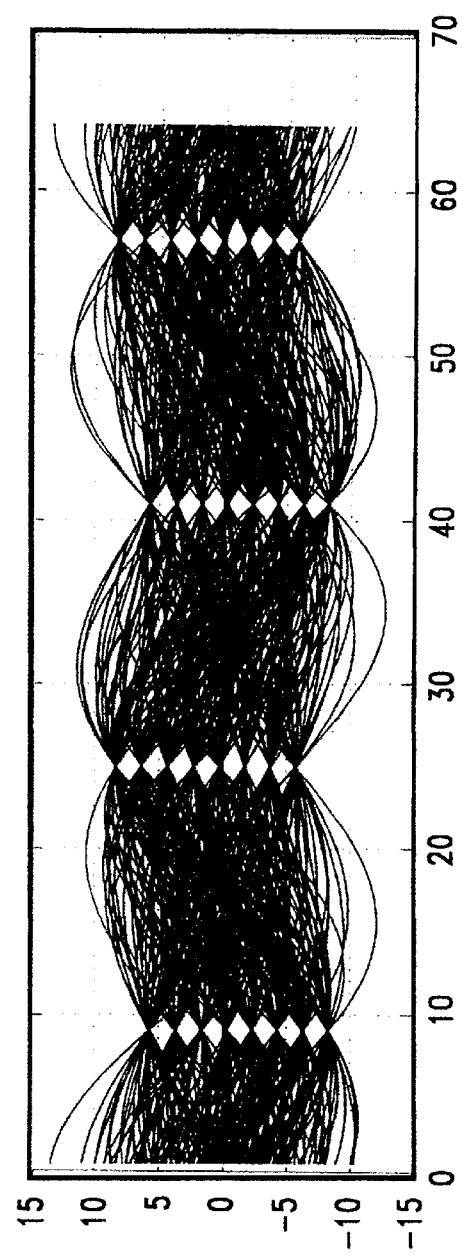

PILOT SIGNAL CONTROL FOR DIGITAL TELEVISION DTV TRANSMISSION

CROSS-REFERENCE TO RELATED APPLICATION

The invention disclosed in this application is related to the commonly assigned invention disclosed in U.S. patent application Ser. No. 09/422,446 filed on Oct. 21, 1999 and issued at U.S. Pat. No. 6,292,518 entitled "Use of 64-QAM circuitry for receiving and decoding 8-VSB signals", the disclose of which is incorporated herein by reference.

STATEMENT REGARDING FEDERALLY SPONSORED RESEARCH & DEVELOPMENT

The U.S. Government may have certain rights in this invention pursuant to the NIST Contract Number 70NANB8H4078, awarded by the National Institute of Standards and Technology.

BACKGROUND OF THE INVENTION

1. Technical Field

This invention relates to controlling a pilot signal in Digital Television (DTV) transmission to better track symbol timing and aiding in pilot signal removal prior to direct use of QAM (Quadrature Amplitude Modulation) demodulator equipment.

2. Background Art

Digital television (DTV) signals in the USA are broadcast using the Advanced Television Standard Committee (ATSC) television standard modulation system which is an eight level vestigial sideband (8-VSB) modulation with a suppressed carrier signal. Conventional 8-VSB receiver designs complex demodulate the received signal with a pilot tone on zero frequency. Under ideal channel conditions, this allows the data symbols to stream on only one of two complex demodulated channels (known as "I-channel only" processing).

The MPEG-2 (Motion Picture Experts Group) packets of the 8-VSB spectrum comprise 208 bytes or 1664 bits corresponding to 832 symbols. There are eight symbol levels (−7, −5, −3, −1, 1, 3, 5, 7).

Currently published 8-VSB transmitter designs recommend applying a DC offset to the data symbol values prior to root raised cosine filtering. The eight symbol levels are combined with a 1.25 positive offset added to create a DC component, pilot tone.

A pilot tone is included in the 8-VSB signal design. The symbol values entering a zero-ISI VSB filter are offset by a DC value to generate the pilot tone. This approach causes the pilot tone to have a particular phase with respect to the symbol detection timing. Present receiver implementations may suggest that this phase is of no consequence when I-channel only receiver processing is conducted, because the pilot tone is used for frequency acquisition only. A complex filter is used to generate the I-channel.

Recent discoveries, as described in the aforementioned copending U.S. patent application Ser. No. 09/422,446 filed on Oct. 21, 1999 and issued at U.S. Pat. No. 6,292,518 entitled "Use of 64-QAM circuitry for receiving and decoding 8-VSB signals", have revealed that the 8-VSB transmission may be received using quadrature amplitude modulated (QAM)-based receiver structures. This is accomplished by using a raised cosine filter convolved with a complex exponential at 2.69 MHZ.

$$C(t) = h(t) \times \cos(\pi n/16) + jh(t) \times \cos(\pi n/16),$$

where $\pi n/16 = (2\pi 2.69n/(8 \times 10.76))$. Using QAM-based receiver designs, superior performance is obtained over the I-channel only receiver designs recommended in the Guide to the Use of the ATSC Standard.

When inserting the pilot tone, as recommended by the Guide to the Use of the ATSC Standard, the phase of the pilot tone is zero relative to the I-channel, and the pilot tone maximally interferes with the symbol detector in a QAM-based receiver design. The pilot phase at 0° moves the symbol threshold values. Multipath effects will dynamically vary the pilot tone amplitude and make successful estimates of the symbol value at the timing instant difficult.

In order to use a QAM demodulator for directly demodulating 8-VSB DTV signals, it is necessary for the receiver chain to first effectively remove the pilot tone which is specified by the DTV standard in order to better enable frequency synchronization. If the phase of the pilot tone is unspecified, the problem becomes one of first estimating and actively removing a tone of arbitrary phase before using the QAM demodulator. This incurs added complexity and cost.

BRIEF SUMMARY OF THE INVENTION

An ATSC-compliant pilot tone is generated within an 8-VSB transmission in order to enable QAM receiver designs to more efficiently process the transmitted/received 8-VSB signal. The method and apparatus also efficiently removes the pilot tone before directly using conventional QAM demodulator equipment.

BRIEF DESCRIPTION OF THE DRAWINGS

FIGS. 5A and 5B are eye diagrams of the I-channel and the Q-channel, respectively, with a 0° phase pilot;

DETAILED DESCRIPTION OF THE PREFERRED EMBODIMENTS

Figure 1:
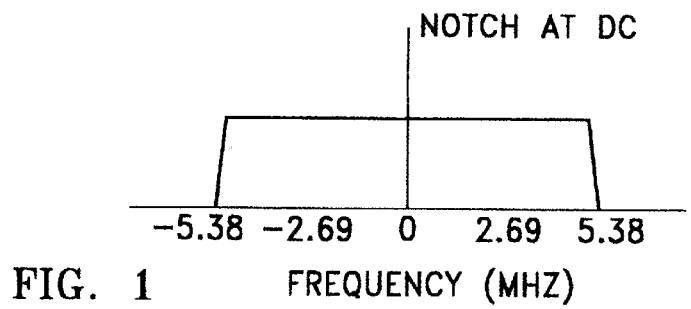
FIG. 1 is a graphical representation of the frequency spectrum of an 8-level pulse amplitude modulated signal.
Figure 2:
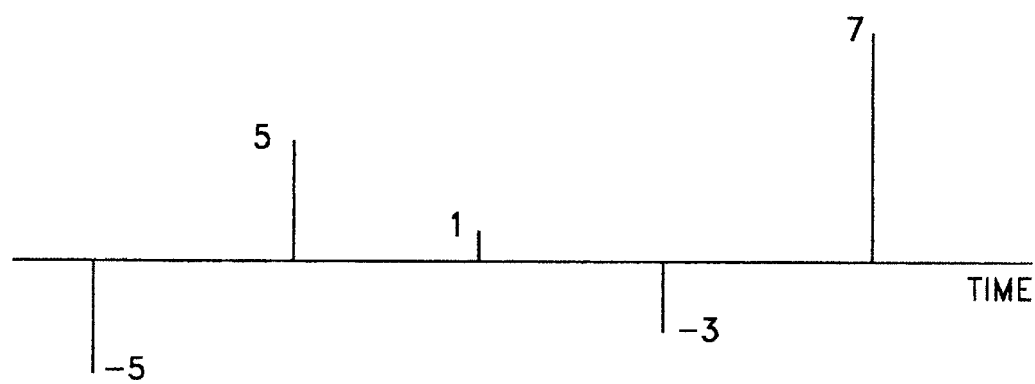
FIG. 2 is a graphical representation of a typical data segment of the ATSC 8-VSB signal.
Figure 3:
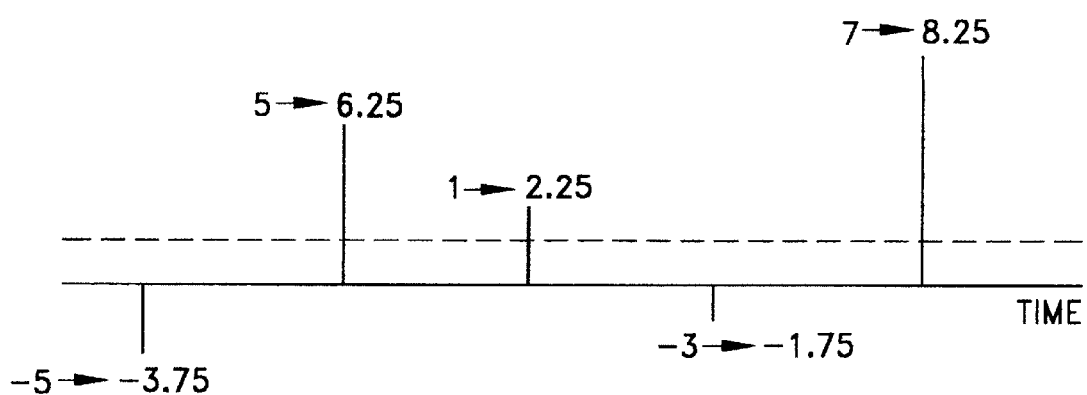
FIG. 3 is a graphical representation of the symbol levels of FIG. 2 with a 1.25 positive offset.
Figure 4:
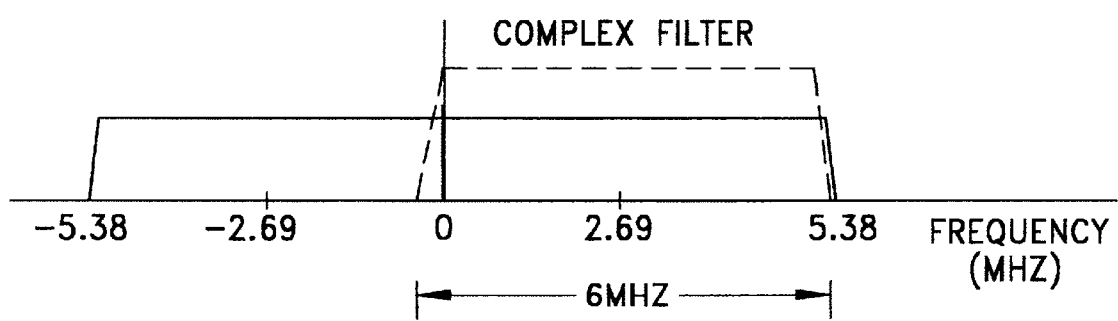
FIG. 4 is a graphical representation of the pass band of a complex filter used to recover the I-channel at the receiver.

FIG. 1 shows the 8-VSB signal spectrum of the ATSC television standard modulation system, and a typical data segment thereof is shown in FIG. 2. The eight symbol levels depicted in FIG. 2 are shown in FIG. 3 combined with a 1.25 positive offset to create a DC component that constitutes a pilot tone. The pilot tone is included in the 8-VSB signal design. Because the symbol values entering a zero-ISI VSB filter are offset by a DC value to generate the pilot tone, the pilot tone has a particular phase with respect to the symbol detection timing. Present receiver implementations may suggest that this phase is of no consequence when I channel only receiver processing is conducted because that pilot tone is used for frequency acquisition only. FIG. 4 shows a complex filter for generating the I channel.

When the pilot tome is inserted, its phase is zero relative to the I-channel, and the pilot tone maximally interferes with the symbol detector in a QAM-based receiver design. FIGS. 5A and 5B show, respectively, the eye diagrams of the I-channel and the Q-channel at the receiver.

Figure 6A:
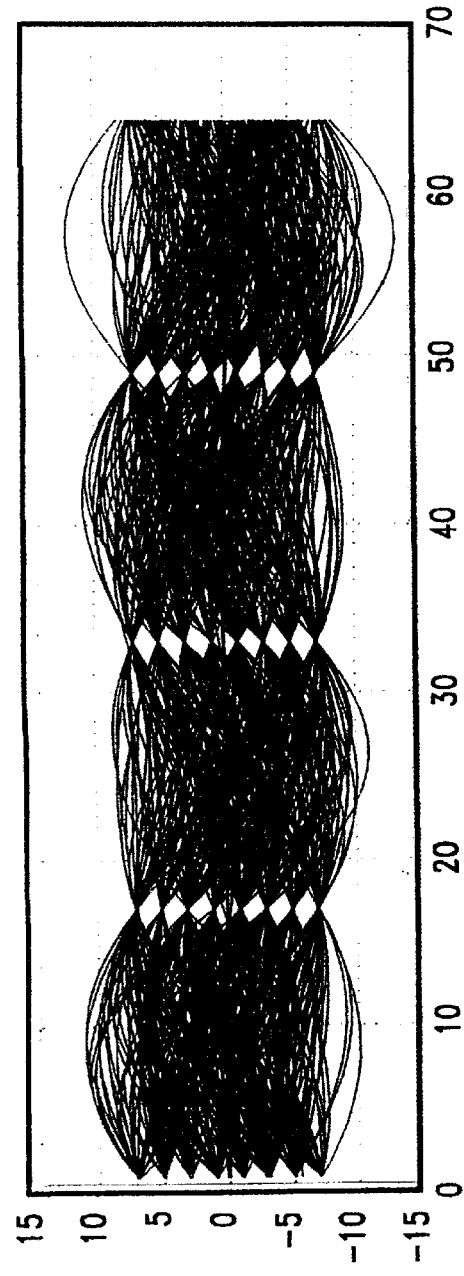
FIGS. 6A and 6B are eye diagrams of the I-channel and the Q-channel, respectively, with a 90° phase pilot.
Figure 6B:
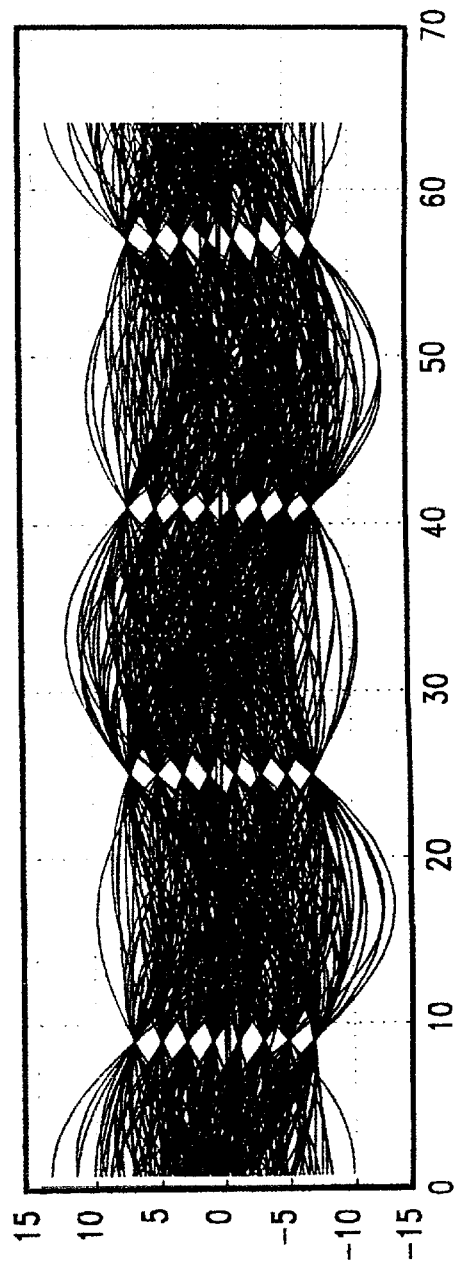

By generating a pilot tone at a phase of 90+180·n degrees, where n is any integer, the zero-crossing of the pilot tone will coincide with the precise symbol decision in the I and Q channel of a QAM-based receiver design. Therefore, the QAM-based receiver does not have to remove the pilot. The Euler's relation between the I channel and the Q channel for a complex tone causes a 90° phase shift (sine versus cosine) that is exactly offset by the offset symbol timing between the I and Q channels when 8-VSB broadcast signals are received by a QAM-based receiver. FIGS. 6A and 6B show, respectively, the eye diagrams of the I-channel and the Q-channel at the receiver for a pilot phase of 90°. It will be noted that the symbol thresholds are not moved.

Figure 7:
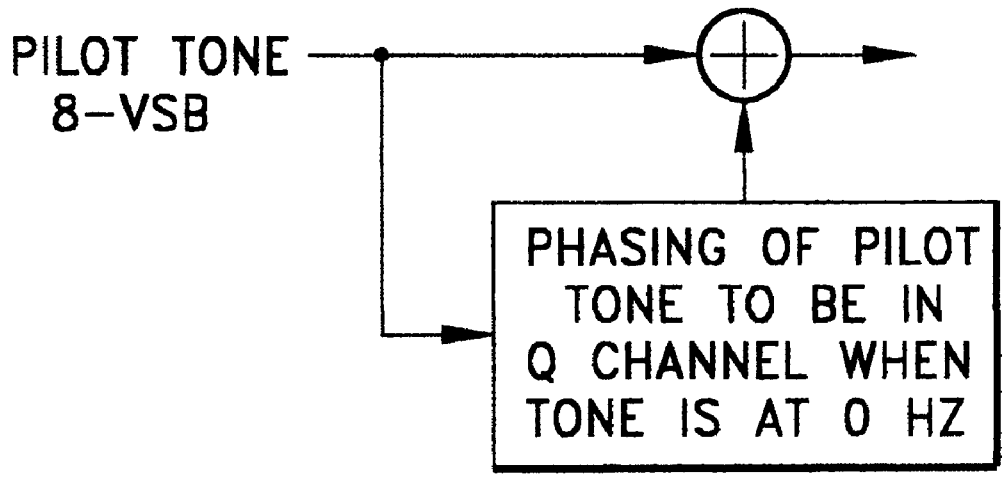
FIG. 7 is a block diagram showing one method of injecting a pilot tone into the 8-VSB transmission.
Figure 8:
FIG. 8 is a block diagram showing an alternative method of injecting a pilot tone into the 8-VSB transmission.

Methods to inject a pilot tone into the 8-VSB transmission are many. Two methods are shown in FIGS. 7 and 8. In FIG. 7, the pilot tone is added to the 8-VSB signal with the phase of the pilot tone such that it is in the Q-channel only when the pilot tone is at zero Hertz. In FIG. 8, a complex root raised cosine VSB filter is used with a data signal at the I input and a dc tone at the Q tone input.

Figure 9:
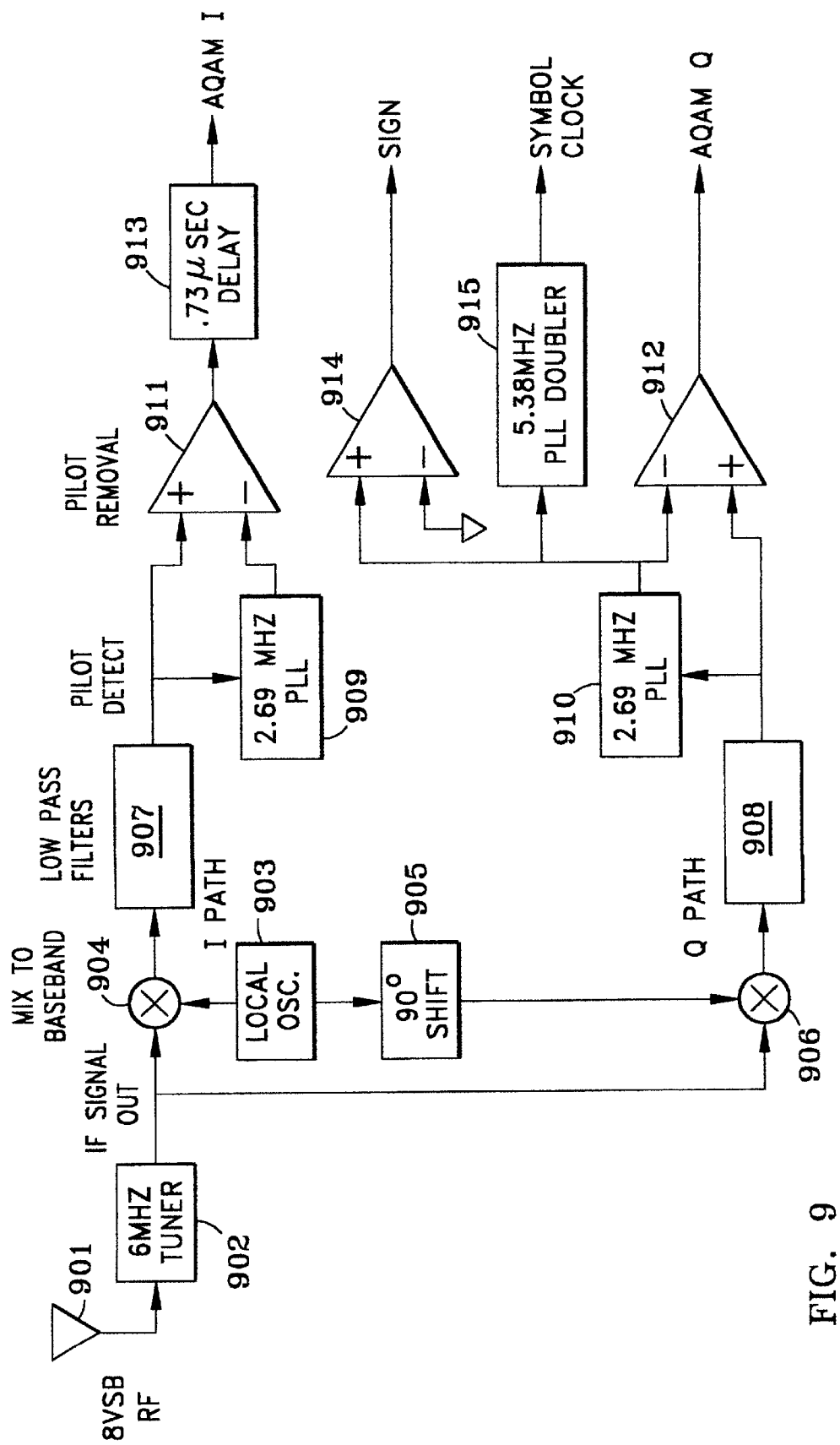
FIG. 9 is a block diagram of an illustrative implementation for converting the received 8-VSB signal to alternating quadrature signals according to the invention.

FIG. 9 shows an implementation of a QAM receiver in accordance with a preferred embodiment of the invention. An 8-VSB digital signal such as that defined by the ATSC digital television broadcast standard is picked up by an antenna 901 and provided to a tuner 902 that produces this signal at an intermediate frequency (IF) that has been bandpass filtered, as is well known in conventional television receiver circuitry. A local oscillator 903 supplies a signal at the intermediate frequency which is mixed in phase with the 8VSB IF signal by a mixer 904 and which, after a 90° phase shift via a 90° phase shifter 905, is mixed in quadrature with the 8-VSB IF signal in a mixer 906. The two signals thus produced by mixers 904 and 906 are filtered through low pass filters 907 and 908, respectively resulting in I and Q base band signals, respectively. Each of these I and Q base band signals is directed to separate respective 2.69 MHz PLLs (Phase Locked Loops) 909 and 910 which lock on to the suppressed carrier signal. Operational amplifiers 911 and 912 then remove the pilot signal from the I and Q signals, respectively, and the signal on the I path undergoes a 0.93 microsecond ($\mu$sec) delay in a delay circuit 913 relative to the signal on the Q path. The I and Q signals, with the pilot signal removed, generate AQAM-I and AQAM-Q (Alternating Quadrature Amplitude Modulation) signals, respectively. The output signal of the 2.69 MHz PLL 910 in the Q path is also sent to a comparator 914 which generates a SIGN output signal that alternates between a logical "1" and a logical "0" when the detected pilot signal is positive and negative, respectively. The output signal of the 2.69 MHZ PLL 910 in the Q path is also sent to a 5.38 MHZ PLL frequency doubler 915, the output signal of which constitutes the symbol clock.

Figure 10:
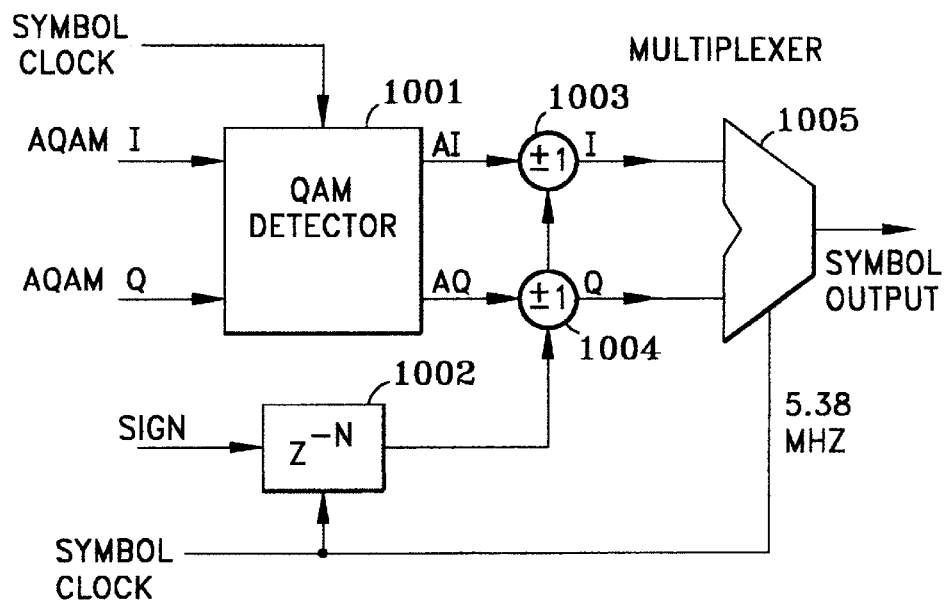
FIG. 10 is a block diagram of the quadrature amplitude modulation (QAM) detector and multiplexer for generating the recovered 8-VSB data symbol output signal.

FIG. 10 shows the AQAM-I and AQAM-Q signals going to a QAM demodulator or detector 1001, which may be any conventional QAM detector that is well known and well understood in the field of communications. The AQAM signals being provided to QAM detector 1001 have all of the characteristics of normal QAM signals and may be treated as such.

QAM detector 1001 produces an I and a Q decision once per symbol clock. These decisions are labeled "AI" and "AQ" for alternating I and Q, respectively, because the symbol values from the QAM are alternately a positive and negative representation of the 8-VSB signals originally encoded in the radio frequency (RF) transmission. The SIGN output signal from comparator 914 shown in FIG. 9 is delayed by N clock symbols in a delay circuit 1002, where N is the delay of signals introduced by QAM detector 1001. The delayed SIGN signal controls a pair of inverter circuits 1003 and 1004 to alternate the sign of the digital representation of the signals provided from QAM detector 1001. The sign-corrected I and Q symbol values from QAM detector 1001 are multiplexed in a multiplexer 1005 by the symbol clock, which switches at a 5.38 MHZ clock rate, so that the data rate of symbol data presented at the output of the multiplexer (SYMBOL OUTPUT) is 10.69 MHZ. These symbol data are the recovered 8-VSB symbol data in the proper order and with the proper sign. The invention is operative, in general, whenever a pilot tone within an N-VSB transmission is processed by an M-QAM receiver, where $M=N^2$. For 8-VSB signals, N=8 and the QAM receiver is a 64 QAM design.

Under ideal channel conditions, the data symbols stream on only one of the two complex demodulated channels. By shifting the waveform by ¼ the symbol rate in frequency and thus centering the waveform spectrum about zero Hertz prior to complex demodulation, data symbols will alternately appear on the I and Q channels of the complex demodulator, occurring on each of the two channels at half the symbol rate.

The implementation shown in FIGS. 9 and 10 uses mostly analog circuitry for purposes of illustration. A digital implementation and a software based implementation may be constructed as well, which will be evident to those skilled in the digital television art.

The system of the invention is described in terms of 8-VSB and 64-QAM. The described techniques apply, however, without loss of generality, to any N-VSB and N-squared QAM system.

The method and apparatus of the invention can also deal with a pilot tone that does not comport to the phase relationship specified in the Guide to the Use of the ATSC Standard. This approach is to remove the pilot tone by generating an additively canceling tone obtained from a squaring loop operating on a co-transmitted wideband overlay signal. A circuit to accomplish this is shown in FIG. 12.

Figure 11:
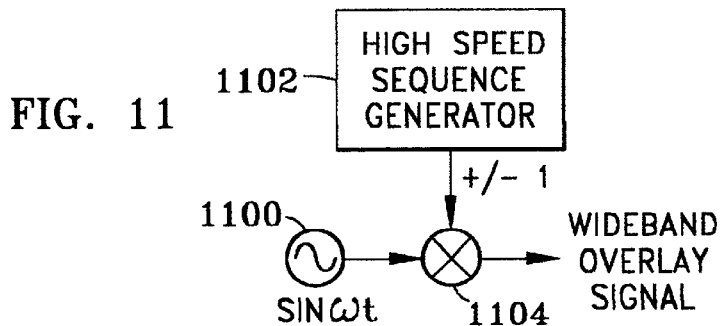
FIG. 11 is a block diagram showing generation of a wideband overlay signal from which a pilot tone is derived.

With reference first to FIG. 11, the overlay signal is a sine wave of angular frequency T produced by a generator 1100 and BPSK (bit phase shift key) modulated by a pseudorandom binary sequence generated by a high speed sequence generator 1102 in a mixer 1104. Squaring the signals in the overlay bandwidth produces two equally large spectral lines, one at DC and the other at 2T.

Figure 12:
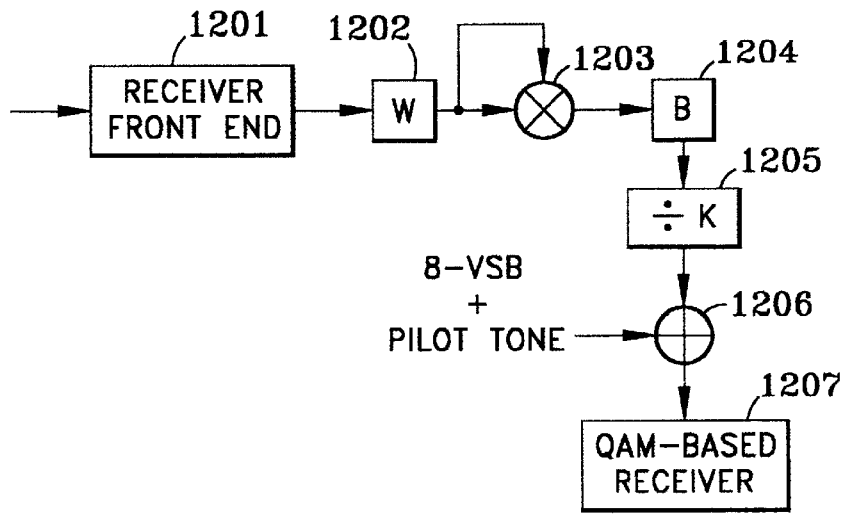
FIG. 12 is a block diagram showing a method of removing the pilot tone from an 8-VSB broadcast transmission.

With reference to FIG. 12, the receiver front end 1201 passes the received and detected signal from mixer 1104 (FIG. 11) to a wide bandpass filter 1202 of spectral width W centered at frequency T. The output signal of bandpass filter 1202 is squared in a multiplier 1203 connected as a squarer to produce the two spectral lines. The output of multiplier 1203 is coupled to a narrow bandpass filter 1204 centered at frequency 2T. A frequency divider 1205 divides the output signal of filter 1204 by a value K selected to bring the 2T spectral line down to the pilot frequency. Assuming that the overlay signal frequency is phased, the division by K results in a proper canceling phase. It is also possible that a phase delay can be insinuated after the division by K. The pilot tone thus derived is additively canceled in adder 1206 with the input pilot tone, and the signal with the removed pilot tone is supplied to QAM-based receiver 1207.

While only certain preferred features of the invention have been illustrated and described, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is:

1. A method of generating a pilot tone within an N-VSB (vestigial sideband) transmission that enables an M-QAM (quadrature amplitude modulation) receiver to efficiently process a received N-VSB signal, where M=N$^2$, comprising the steps of:

generating the pilot tone at a phase of 90+180·n degrees, where n is any integer, so that a zero-crossing of the pilot tone will coincide with precise symbol decisions in I and Q channels of the M-QAM receiver; and inserting the generated pilot tone into the N-VSB transmission.

2. A method of removing a pilot tone within an N-VSB (vestigial sideband) modulation signal and converting the N-VSB signal into an M-QAM (quadrature amplitude modulation) signal, where M=N$^2$, comprising the steps of:

deriving the pilot tone at the receiver from a wideband overlay signal transmitted with the N-VSB signal;

additively canceling the pilot tone in the N-VSB signal with the derived pilot tone before processing the N-VSB signal;

shifting a symbol rate frequency of the received N-VSB modulation signal to center the waveform spectrum about zero Hertz prior to complex demodulation so that data symbols will alternately appear on the I and Q channel of the complex demodulation process;

removing the pilot tone of the received N-VSB modulation signal to eliminate any bias in both I and Q channels;

offsetting symbol timing between I and Q channels;

quadrature amplitude demodulating the I and Q channels to generate alternating I and Q channel data symbols; and alternating inversion of the alternating I and Q channel data symbols to recover the N-VSB symbol data.

3. The method of claim 2, wherein N=8, M=64 and the symbol rate of the received N-VSB modulation signal is shifted by ¼ symbol rate.

4. The method of claim 2, further comprising the step of combining the alternating inversion of the I and Q channel data.

5. A digital television receiver for converting an N-VSB (vestigial sideband) modulation signal containing a pilot tone into an M-QAM (quadrature amplitude modulation) signal, where M=N2, comprising:

a first circuit for deriving the pilot tone at the receiver from a wideband overlay signal transmitted with the N-VSB signal;

a second circuit connected to the first circuit for additively canceling the pilot tone in the N-VSB signal with the derived pilot tone before the N-VSB signal is processed;

a third circuit connected to the second circuit for shifting a symbol rate frequency of a received N-VSB modulation signal to center the waveform spectrum about zero Hertz prior to complex demodulation so that data symbols will alternately appear on each of an I and Q channel during the complex demodulation process;

a fourth circuit connected to the third circuit for removing the pilot tone of the received N-VSB modulation signal to eliminate any bias in both of the I and Q channels;

a fifth circuit connected to the fourth circuit for offsetting symbol timing between the I and Q channels;

a quadrature amplitude demodulator connected to the fifth circuit for demodulating the I and Q channels to generate alternating I and Q channel data symbols; and an inverter circuit connected to the quadrature amplitude demodulator for inverting alternating I and Q channel data symbols to recover the N-VSB symbol data.

6. The digital television receiver recited in claim 5, wherein the first circuit comprises a squarer for generating a spectral line from which the pilot tone is derived.

7. The digital television receiver recited in claim 6, wherein the third circuit includes first and second mixers for receiving an intermediate frequency signal and further includes an in phase and quadrature phase local oscillator signal to generate, respectively, I and Q channel output signals at baseband.

8. The digital television receiver recited in claim 7, wherein the fourth circuit includes in each of said I and Q channels, a pilot signal detector and a subtractor for subtracting a detected pilot signal from respective I and Q channel output signals.

9. The digital television receiver recited in claim 8, wherein the fifth circuit comprises a first delay.

10. The digital television receiver recited in claim 9, further comprising a sign generator and a symbol clock generator responsive to one of said pilot signal detectors and a second delay responsive to a symbol clock from the symbol clock generator to delay a sign output signal of the sign generator.

11. The digital television receiver recited in claim 10, wherein the quadrature amplitude demodulator is adapted to demodulate signals in the I and Q channels in response to the symbol clock generator and the inverter is responsive to the delayed sign output signal to generate I and Q output signals.

12. The digital television receiver recited in claim 11, further comprising a multiplexer responsive to the symbol clock for combining the I and Q output signals of the inverter to recover the N-VSB symbol data.

13. The digital television receiver recited in claim 12, wherein N=8 and M=64.

14. A digital television receiver for converting an N-VSB (vestigial sideband) modulation signal containing a pilot tone into an M-QAM (quadrature amplitude modulation) signal, where M=N2, comprising:

a first circuit for deriving the pilot tone at the receiver from a wideband overlay signal transmitted with the N-VSB signal;

a second circuit connected to the first circuit for additively canceling the pilot tone in the N-VSB signal with the derived pilot tone before the N-VSB signal is processed;

a third circuit connected to the second circuit for shifting a symbol rate frequency of a received N-VSB modulation signal to center the waveform spectrum about zero Hertz prior to complex demodulation so that data symbols will alternately appear on each of an I and Q channel during the complex demodulation process;

a fourth circuit connected to the third circuit for removing the pilot tone of the received N-VSB modulation signal to eliminate any bias in both of the I and Q channels;

a delay circuit connected to the fourth circuit for offsetting symbol timing between the I and Q channels;

a quadrature amplitude demodulator connected to the delay circuit demodulating the I and Q channels to generate alternating I and Q channel data symbols;

an inverter circuit connected to the quadrature amplitude demodulator for inverting alternating I and Q channel data symbols to recover the N-VSB symbol data; and a multiplexer connected to the inverter circuit and responsive to a symbol clock for combining the I and Q output signals of the inverter circuit to recover the N-VSB symbol data.

\* \* \* \* \*